Dec. 20, 1960  C. DE GANAHL  2,965,251
HAY BALE STACKING SLED
Filed July 27, 1959
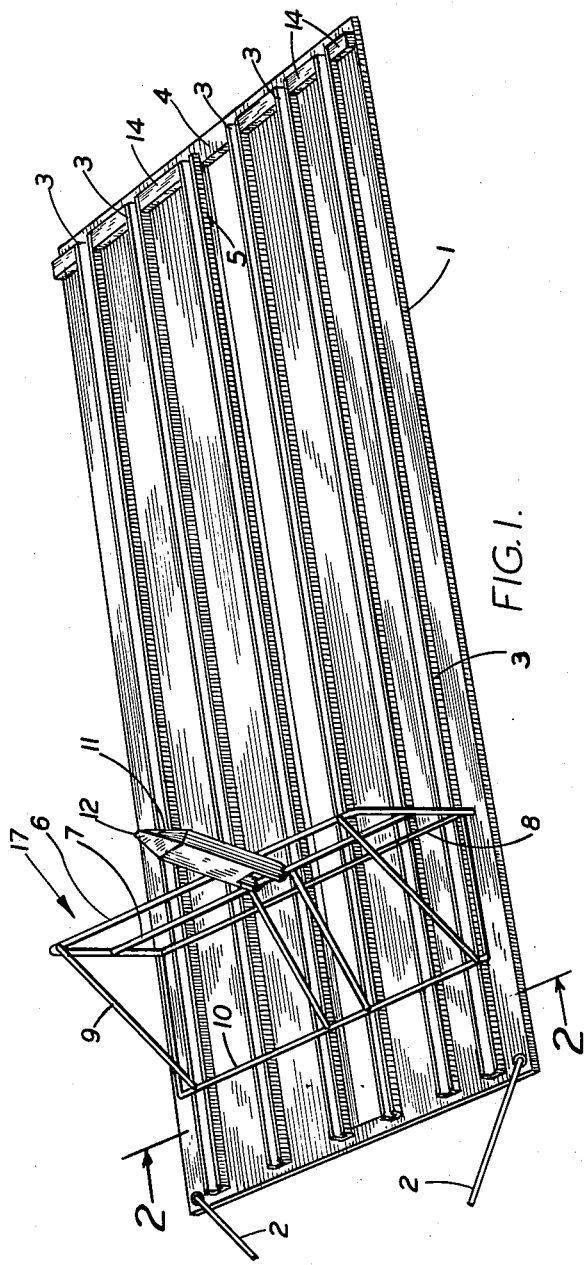
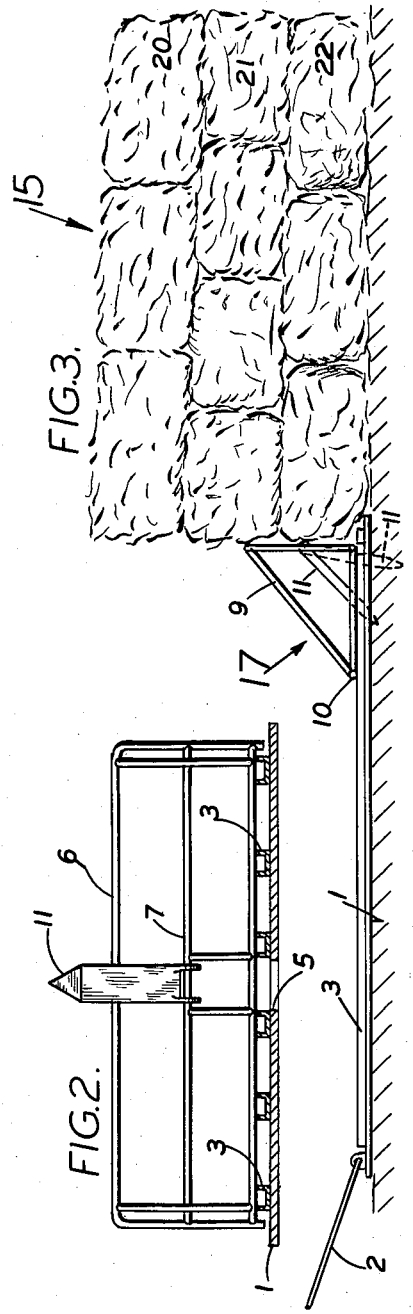
INVENTOR.
CHARLES de GANAHL
BY
ATTORNEYS

United States Patent Office 2,965,251
Patented Dec. 20, 1960

2,965,251
HAY BALE STACKING SLED

Charles de Ganahl, Box 75, Yampa, Colo.

Filed July 27, 1959, Ser. No. 829,703

6 Claims. (Cl. 214—82)

This invention relates to hay carrying sleds and more particularly to baled-hay stacking sleds which provide an efficient conveyance for field scattered hay bales and for forming small stacks for a subsequent pickup by a stacker.

After hay is cut and windrowed for curing, in many instances it is picked up by a baler which forms the hay into essentially rectangular bales. Due to the operation of the baler, the bales are scattered indiscriminatively around the hay field, but for preservation of the hay these bales must be gathered and placed in large storage stacks. The bales are not only indiscriminatively positioned around the field but also are in every conceivable position so that for gathering the bales must be individually handled and loaded on a conveyance. Common practice calls for loading the bales on a wagon or truck which is then driven to a hay stack, where it is unloaded and then placed on a stack. A worker on the stack is necessary to place the bales in neat, orderly orientation on the stack.

According to the present invention I have provided a sled on which bales of hay may be stacked in correct orientation for conveyance of the small stack as a whole to a storage stack by a pickup and stacker mechanism, such as described in my co-pending application Serial No. 829,704, filed July 27, 1959. The sled is essentially at ground level so that bales on the initial layer do not have to be raised any substantial height from the ground and subsequent layers of bales need only be raised a height to clear the layers already on the sled. The sled is pulled by a prime mover or the baler itself around the field so that the bales may be picked up and placed in properly oriented stacks in which the bales of superimposed layers are interlocked for subsequent disposition on a storage stack. When a sufficient number of bales are loaded on the sled, the entire stack may be discharged from the sled readily and easily while maintaining a stack intact with the bales in proper orientation.

Included among the objects and advantages of the present invention is a simplified hay bale gathering device which provides a low carriage device onto which bales may be stacked for subsequent transportation as a load of bales to a large storage stack. The device provides means for discharging the stacked bales intact from the sled in position for pickup by a subsequent baled hay conveyance.

These and other objects and advantages of the invention may be readily ascertained by referring to the following description and appended illustrations in which:

Fig. 1 is a perspective view of a hay bale sled according to the invention;

Fig. 2 is a cross sectional view of the device of Fig. 1 taken along section line 2—2; and Fig. 3 illustrates the method of utilizing the sled in unloading a stack of baled hay therefrom.

The sled of the invention consists of a planar bed 1, which in its simplest form may be a series of steel plates, boards or plywood arranged with two cables 2 for attachment to a prime mover. Other connection means may, of course, be used and the prime mover may be a tractor, a tractor-drawn baler, truck, horses or the like which may pull the sled over the stubble of the hay field. By providing the sled with a smooth bottom, the sled is easily pulled over the stubble, and even when a load is stacked on the sled the stubble effectively lubricates the sled so that it is relatively easy to draw over the ground. Secured to the top of the bed 1 are a series of channel irons 3 extending from substantially the front to the rear thereof. A series of bars 4 are secured to the body and extend across the rear or end opposite the tow mechanism. A narrow slot 5 extends through the body 1 from near the front to the rear portion of the body substantially centerwise of the sled. A slide or unload mechanism is disposed on top of the sled and is arranged to ride along the channels 3. The slide is provided with essentially parallel bars 6, 7 and 8 extending upwardly from the sled and brace members 9 support the bars upright position. The braces 9 are secured to a bar 10 spaced from bar 8 which supports the slide in upright position. Guides for the slide may be provided, where desired, to ride along the channels and guide the slide. A swinging tooth 11 having a pointed end 12 is pivotally connected to the middle bar 7, and it is arranged to swing from an upright inoperative position to a lower position in the slot 5 in contact with the ground below the sled.

The sled is such a size to hold approximately ten bales of hay in a layer, and normally three such layers as 20, 21 and 22, indicated in Fig. 3, are loaded on the sled. The slide, designated as a whole by 17, is arranged to move along the top of channels 3 in contact with the bales of the bottom layer so they may be moved as a unit. The blocks 14 prevent the slide from leaving the sled. In another form, a low tail gate may be hinged to the after section of the sled. The tail gate may then be raised to hold the bales on the sled and lowered rearwardly for discharge of the stack from the sled.

In operation the sled is attached to a prime mover and is pulled around the field where the bales of hay are disposed, or is attached to the baler so as to catch the bales discharged from the baler. A worker or team of workers pick up the bales and place them in layers on the sled as illustrated in Fig. 3. The layers are arranged so that each bale in the upper layers rests on two bales the next lower layer, forming an interlocked stack. When the requisite number of bales are stacked on the sled the tooth is swung into contact with the ground. As the prime mover continues to pull the sled, the tooth holds the slide 17 and the stack essentially stationary permitting the sled to be drawn out from beneath the bales of hay. Thus the stack is deposited substantially intact on the ground. When the tooth hits the bar 4, it is kicked out of the ground stopping further movement. The slide may be pulled to the front of the sled with the tooth in up position ready for another load of hay. The channels are placed to extend a distance above the upper surface of the sled so that the hay rides along the channels which act as tracks. The tracks prevent side slipping of the bales maintaining the stack intact and forcing it to move straight along the channels off the sled. Once deposited in the field the stack is available for pickup by a stacker-pickup.

While the invention has been described by reference to a particular device, there is no intent to limit the invention to the precise details so set forth except insofar as defined in the following claims.

I claim:

1. A baled hay sled comprising a planar body of substantial width and length having an elongated slot therethrough extending from adjacent one end to adjacent the opposite and substantially centerwise thereof, means for securing said sled to a prime mover, a plurality of tracks extending upwardly from the top surface of the body lengthwise of said sled and substantially parallel with said slot, a stack pusher reciprocally mounted on said tracks, a ground contacting tooth pivotally mounted on said pusher arranged to pivot from an upper inoperative position to a ground contacting position in said slot for holding said pusher stationary while the sled is pulled to thereby unload a stack of baled hay carried on the sled, and stop means at the end of said slot arranged to contact said tooth pulling same from the ground during movement of said sled and thereby prevent further movement of said pusher.

2. A baled hay sled comprising a planar body having an elongated slot lengthwise thereof extending from adjacent one end to adjacent the other end, means for securing said sled to a prime mover, a plurality of upstanding tracks mounted on said body extending lengthwise of said sled and substantially parallel with said slot, a stack pusher reciprocally mounted on said tracks, a ground contacting tooth pivotally mounted on said pusher arranged to pivot from an upper inoperative position to a ground contacting position in said slot for holding said pusher stationary while the sled is pulled to thereby unload a stack of baled hay carried on the sled, and stop means at the end of said slot arranged to contact said tooth pulling same from the ground during movement of said sled and thereby prevent further movement of said pusher.

3. A sled according to claim 2 in which the pusher is an upright frame member arranged to contact the ends of the bales on the first layer of bales on the sled so as to move a load substantially intact.

4. A baled hay sled comprising a planar body, means for securing said sled to a prime mover, a plurality of upstanding tracks extending lengthwise of said sled and substantially parallel to its direction of movement, a stack pusher reciprocally mounted on said tracks and arranged to move from one end to the other, means for holding said pusher stationary while the sled is pulled to thereby unload intact a stack of baled hay carried on the sled, and stop means adjacent the end of said sled to stop said pusher after the carried load is discharged.

5. A sled according to claim 4 in which the tracks on the sled extend a sufficient distance above the sled to support the carried hay and provide a guide for movement of such hay along the sled.

6. A baled hay sled comprising a planar body of substantial length having at least one elongated slot therethrough extending from a forward position to a rearward position centerwise thereof, means for securing said sled to a prime mover, a plurality of upstanding tracks mounted on said body and extending lengthwise of said sled substantially parallel its direction of travel, stack pusher means reciprocally mounted on said tracks, at least one ground contacting tooth pivotally mounted on said pusher juxtaposed with each slot and arranged to pivot from an upper inoperative position to a ground contacting position in the slot for holding said pusher stationary while the sled is pulled to thereby unload intact a stack of baled hay carried on the sled, and stop means at the end of each said slot arranged to contact each said tooth pulling same from the ground during movement of said sled and thereby prevent further movement of said pusher.

No references cited.